United States Patent [19]

Akiyama et al.

[11] 4,209,592
[45] Jun. 24, 1980

[54] SULPHONATION METHOD FOR MANUFACTURE OF A CATION EXCHANGE RESIN

[75] Inventors: Hiroshi Akiyama, Ichikawa; Hiroshi Kuyama, Urawa; Kohji Oinuma, Tokyo, all of Japan

[73] Assignee: Rohm and Haas Company, Philadelphia, Pa.

[21] Appl. No.: 874,447

[22] Filed: Feb. 2, 1978

[51] Int. Cl.$^2$ .................... C08F 8/36; B01D 15/04
[52] U.S. Cl. ............................ 521/33; 525/343
[58] Field of Search ............... 526/30, 46; 260/2.2 R, 260/79.3 R; 521/33

[56] References Cited

U.S. PATENT DOCUMENTS

| | | | |
|---|---|---|---|
| 2,763,634 | 9/1956 | Teot | 260/79.3 R |
| 2,836,578 | 5/1958 | Teot | 528/171 |
| 2,962,454 | 11/1960 | McRae et al. | 260/79.3 R |
| 3,072,618 | 1/1963 | Turbak | 260/79.3 R |
| 3,252,921 | 5/1966 | Hanson et al. | 260/2.2 R |
| 3,549,729 | 12/1970 | DiPietro | 260/30.6 R |

FOREIGN PATENT DOCUMENTS

| | | | |
|---|---|---|---|
| 746616 | 3/1956 | United Kingdom | 526/30 |
| 794426 | 5/1958 | United Kingdom | 526/30 |

Primary Examiner—Joseph L. Schofer
Assistant Examiner—Peter F. Kulkosky
Attorney, Agent, or Firm—John E. Taylor, III

[57] ABSTRACT

A process of sulfonating a crosslinked copolymer to yield a cation exchange resin using liquid sulfur trioxide dissolved in a chlorinated hydrocarbon solvent as the sulfonating reagent.

10 Claims, No Drawings

SULPHONATION METHOD FOR MANUFACTURE OF A CATION EXCHANGE RESIN

This invention relates to a method for the manufacture of a cation exchange resin. The method of this invention aims to provide a product of excellent appearance at a low cost by using industrial chemicals in smaller amounts and issuing waste water in a smaller amount than the conventional method.

Reagents which have heretofore been used for the introduction of sulfonic groups into crosslinked polymers include concentrated sulfuric acid, fuming sulfuric acid, chloro-sulfonic acid and sulfur trioxide. Of the sulfonating agents, concentrated sulfuric acid is least expensive. In the ion-exchange resin manufacturing industry, therefore, concentrated sulfuric acid is generally used for sulfonation.

When concentrated sulfuric acid is used the acid must be used in a great excess of 8 to 9 mols per mol of aromatic nucleus of the crosslinked vinyl polymer so as to add to the fluidity of the reaction system and facilitate the maintenance of temperature. Actually, complete sulfonation is attained by substitution of about one sulfonic acid group per aromatic nucleus in the polymer. It is extremely difficult to have the excess regenerated and put to re-use. When concentrated sulfuric acid is used for the sulfonation, water is formed as a by-product and consequently lowers the concentration of the acid to the point where the acid is no longer useful as a sulfonation reagent. The acid then is diluted further with the water which has been used in the washing step. Consequently, it eventually gives rise to a large volume of spent acid colored in black/brown, which is discarded from the reaction system. Disposal of the large volume of spent acid turns out to be a heavy economic burden which is the main cause for a markedly increased cost of production.

When chlorosulfonic acid is used as the sulfonating agent, hydrogen chloride gas occurs as a by-product. Because of this by-product, the production requires use of a highly acidproofed reaction system. Disposal of the by-produced hydrogen chloride gas entails a heavy economic burden similarly to the disposal of spent sulfuric acid.

Of the various sulfonating agents, sulfur trioxide yields no by-product of reaction. The excess portion of sulfur trioxide which has been used can be recovered and put to re-use. Thus this particular sulfonating agent can be utilized substantially quantitatively. This agent, therefore, has an advantage that no spent acid results from its use. Sulfur trioxide, though more expensive than concentrated sulfuric acid, may well be called a far less expensive and ideal sulfonating agent when the expense otherwise required for disposal of spent acid is taken into account. The fact remains, however, that of all the sulfonating agents available, sulfur trioxide is most difficult to handle.

Sulfur trioxide has high reactivity such that upon contact with moist air, it reacts violently with the moisture and produces sulfuric acid with evolution of white hume. Sulfur trioxide occurs in the form of a mixture of $\alpha$-, $\beta$- and $\gamma$-isomers having melting points of 62.3° C. or over ($\alpha$), 32.5° C. ($\beta$) and 16.8° C. ($\gamma$). Normally it is solid at room temperature.

When sulfur trioxide is commercially used as a sulfonating agent, it must be in the form of liquid or gas for convenience of handling. A method for the sulfonation of crosslinked vinyl polymer by use of gaseous sulfur trioxide is disclosed in the Japanese Official Gazette of Patent Publication No. 17494/1962. This sulfonation is directed to crosslinked vinyl polymers of the MR (macroporous) structure type which readily undergo sulfonation. This method is at a disadvantage in not readily sulfonating crosslinked vinyl polymers of the type possessed of gel (microporous) structures. Further, the operation must be controlled so as to keep sulfur trioxide at all times in its gaseous form and the reaction equipment must be in a thoroughly air-tight structure.

Recently, liquid sulfur trioxide (of which more than 99.5% consists of $\gamma$-sulfur trioxide) incorporating a stabilizer has become available. Even this stabilized liquid sulfur trioxide is not perfectly stable; when the seal of its container is broken, polymerization of sulfur trioxide from the $\gamma$ type to the $\beta$ and $\alpha$ types proceeds until solidification because of exposure to air.

We have now discovered that conversion of sulfur trioxide into a liquid form, which is easily handled and chemically stable can produce a useful sulfonating reagent. The sulfur trioxide is dissolved in a solvent to produce the liquid form. By solvent is meant a solvent capable of swelling a crosslinked vinyl polymer. A mixed liquid consisting of sulfur trioxide and a chlorine type hydrocarbon compound which dissolves sulfur trioxide and remains stable in its presence such as sulfur trioxide and ethane dichloride in a proportion of 30:70 (sulfur trioxide:ethane dichloride) by weight was not solidified even when it was cooled to $-7°$ C., whereas sulfur trioxide alone is solid at normal room temperature. This mixed liquid retained its properties and reactivity intact after one week's standing at room temperature. Thus, it may well be called an excellent sulfonating agent; excellent in the sense of the stability exhibited in the liquid state. For the preparation of the mixed liquid, chlorinated aliphatic hydrocarbons such as methyl chloride, methylene chloride, chloroform, carbon tetrachloride, propylene dichloride, methyl chloroform and tetrachloroethane as well as said ethane dichloride prove to be practically convenient solvents. The ratio of said solvent to sulfur trioxide in the mixed liquid is desired to be such that sulfur trioxide accounts for 20 to 50% by weight based on the total weight of the mixed liquid.

In terms of reactivity, while in the ordinary method of sulfonation using concentrated sulfuric acid, the reaction temperatures are required to fall in the range of from 100° C. to 150° C., the mixed liquid consisting of sulfur trioxide and said solvent in accordance with the present invention can produce a product having high ion exchange capacity readily at temperatures of from 20° C. to 70° C. With gaseous sulfur trioxide, sulfonation of a crosslinked vinyl polymer of a gel structure is difficult to obtain. With the sulfonating agent of this invention, crosslinked vinyl polymers of gel type and MR type can be effectively sulfonated by use of concentrated acid under mild reaction conditions. This fact suggests that the sulfonating agent of this invention excels in reactivity. Use of this sulfonating agent, therefore, has an advantage that gel type crosslinked vinyl polymers which have defied sulfonation by the ordinary method can be sulfonated. The fact that, with conventional products (containing 4 to 15% crosslinker), the reaction is attained under lower reaction temperatures is due to improvement in the sulfonation and to repression of the secondary reaction such as of black product of carbonization.

A method using liquid sulfur trioxide for the manufacture of ion exchange resins is disclosed in U.S. Pat. No. 2,773,231. In the operation of the method of this U.S. patent, said sulfur trioxide is used and handled in its normal form.

Addition of a small amount of an organic acid such as acetic acid and an inorganic acid such as phosphoric acid to the mixed liquid prepared as the sulfonating agent of this invention is also effective in promoting the sulfonation.

The method of the present invention will be described hereinafter with reference to working examples. The invention is not limited to these examples, insofar as it does not depart from the spirit of the invention.

EXAMPLE 1

Mixed liquids having a sulfur trioxide content of 30% were prepared by adding to 30 g of liquid sulfur trioxide 70 g of ethane dichloride (I) and propylene dichloride (II) respectively. The mixed liquids were held in tightly stoppered 200-ml glass vials and put into storage at normal room temperature. Similarly liquid sulfur trioxide was held in tightly stoppered vials and put to storage. In the first two vials, no discernible change was found after 6 days of standing. The mixed liquids in these vials were sampled and analyzed for sulfur trioxide to reveal absolutely no degradation of composition. In the vial containing the liquid sulfur trioxide alone, about half the contents had turned into needle-shaped crystals by the end of 6 days' standing.

In a four-necked flask having an inner volume of 100 ml, 10 g of a styrene-divinylbenzene copolymer 20–50 mesh in particle diameter synthetized as a crosslinked vinyl polymer of MR structure was placed and then agitated with 75 g of the mixed liquid (I) of ethane dichloride and sulfur trioxide prepared as indicated above, at normal atmospheric pressure and 50° C. for four hours to sulfonate the copolymer. Then the sulfonation product was filtered to remove therefrom the excess portion of sulfur trioxide remaining in the unaltered form, hydrated and thereafter converted into a sodium salt by neutralization with an aqueous 10% caustic soda solution. Subsequently the sodium salt was thoroughly washed with deionized water and tested for chemical properties. The results of the analysis are shown in Table 1. Sulfonation of the same crosslinked vinyl polymer by use of concentrated sulfuric acid (98%) had to be continued at 125° C. for six hours to obtain the same degree of sulfonation.

TABLE 1

| Method of Preparation | Conditions for Sulfonation | Analyses of sulfonation Product | | | |
|---|---|---|---|---|---|
| | | Wt. Cap. (meq/g) | Vol. Cap. (meq/ml) | Moist. (%) | Uncreacked resin Resin Beads (%) |
| Method of the present invention | 50° C./4$^{Hrs}$ | 4.42 | 1.75 | 50.8 | 99 |

Liquid sulfonating agents having sulfur trioxide contents of 50%, 20% and 10% were prepared and tested for sulfonation by following the procedure described above. There were obtained similar sulfonation product.

EXAMPLE 2

By following the procedure of Example 1, sulfonation was carried out by using 106 g (1 mol equivalent weight) of the same styrene-divinylbenzene copolymer and 800 g of sulfur trioxide-ethane dichloride mixed liquid (having a sulfur trioxide content of 20%) containing 2 mol equivalent weights of sulfur trioxide. Test showed the product to have an ion-exchange capacity of 4.41 meq/g, indicating that approximately one sulfonic acid group had been incorporated per aromatic ring. In a four-neck flask having an inner volume of 100 ml, 10 g of the same crosslinked vinyl polymer was placed and then agitated with 75 g of 98% concentrated sulfuric acid at 125° C. for six hours to sulfonate the polymer. Test showed the sulfonation product to have an ion exchange capacity of 4.40 meq/g, indicating that the conversion of said sulfonating agent was 10 to 15% and the remaining 85 to 90% of the acid waste as a spent acid. By contrast, the conversion of the sulfonating agent used in the present example was about 50%. When the unaltered sulfonating agent was subjected to distillation under vacuum while continuing the supply of nitrogen into the product phase at normal room temperature, there was recovered 650 g of the sulfonating agent containing 0.75 mol equivalent weight of sulfur trioxide. Since the recovered sulfonating agent could be put to re-use after adjustment of the concentration of sulfur trioxide, the actual conversion of the sulfonating agent in this example turned out to be about 80%.

EXAMPLE 3

Into a four-neck flask having an inner volume of 100 ml, 10 g of a styrene-divinylbenzene copolymer (8% DVB crosslinker) 20–50 mesh in particle diameter synthesized by a known method as a crosslinked vinyl polymer of gel structure was added, swelled with ethane dichloride and subsequently agitated at 70° C. for six hours with 75 g of a mixed liquid of ethane dichloride and sulfur trioxide (mixing ratio of 70:30) prepared as indicated in Example 1 to sulfonate the polymer. The sulfonation product was analyzed. The results are shown in Table 2.

Table 2

| Method of preparation | Conditions for sulfonation | Analyses of sulfonation products | | | |
|---|---|---|---|---|---|
| | | Wt. Cap. (meq/g) | Vol. Cap. (meq/ml) | Moist. (%) | Uncreacked resin beads (%) |
| Method of the present invention | 70° C./16$^{Hrs}$ | 4.41 | 1.95 | 46.1 | 96 |

EXAMPLE 4

To the mixed liquid (II) of propylene dichloride and sulfur trioxide prepared as indicated in Example 1 above, 5% each of acetic acid and phosphoric acid were respectively added. By repeating the procedure of Example 3, sulfonation was carried out by using each of the sulfonating agents. The products of sulfonation were tested for ion exchange capacity. The results are shown in Table 3. The data show that incorporation of phosphoric acid and acetic acid in the mixed liquid had an effect of promoting the sulfonation.

TABLE 3

| Compound added to mixed sulfonating agent | Conditions for sulfonation | Ion Exchange Capacity (meq/g) |
| --- | --- | --- |
| Acetic acid | 60° C./4 Hours | 4.45 |
| Phosphoric acid | 60° C./4 Hours | 4.42 |
| None added | 60° C./4 Hours | 4.00 |

EXAMPLE 5

This example illustrates continuous operation. A glass column measuring 15 mm in inside diameter and 30 cm in length and provided with a glass filter was set in position inside a reaction system. In the column, 10 g of the same styrene-divinylbenzene copolymer as used in Example 2 was placed and then the mixed liquid of ethane dichloride and sulfur trioxide (mixing ratio 70:30) prepared as indicated in Example 1 above was fed downflow at room temperature for five hours to sulfonate the polymer. The resultant sulfonation product was found to have an ion exchange capacity of 4.43 meq/g, a value equivalent to that obtainable by the batchwise operation.

The mixed sulfonating agent of the present invention is also advantageous from the economic point of view in the sense that it is characterized by issuing no secondary product in the reaction system.

We claim:

1. A method for the manufacture of high-capacity, cation exchange resin beads having greater than about 95% unbroken beads which comprises contacting a crosslinked aromatic vinyl copolymer, in the form of beads, with sulfur trioxide in a liquid form obtained by dissolution of sulfur trioxide in a chlorinated hydrocarbon solvent until approximately one sulfonic acid group has been incorporated per aromatic nucleus in the beads, and recovering the sulfonated, crosslinked, aromatic vinyl copolymer cation exchange resin beads therefrom.

2. The method of claim 1 wherein the chlorinated hydrocarbon solvent is methyl chloride.

3. The method of claim 1 wherein the chlorinated hydrocarbon solvent is methylene chloride.

4. The method of claim 1 wherein the chlorinated hydrocarbon solvent is chloroform.

5. The method of claim 1 wherein the chlorinated hydrocarbon solvent is carbon tetrachloride.

6. The method of claim 1 wherein the chlorinated hydrocarbon solvent is propylene dichloride.

7. The method of claim 1 wherein the chlorinated hydrocarbon solvent is methyl chloroform.

8. The method of claim 1 wherein the chlorinated hydrocarbon solvent is tetrachloroethane.

9. The method of claim 1 wherein the chlorinated hydrocarbon solvent is ethane dichloride.

10. The method of claim 1 wherein the crosslinked vinyl copolymer is a styrene-divinylbenzene copolymer.

* * * * *